United States Patent [19]

Baxter

[11] Patent Number: 4,670,988
[45] Date of Patent: Jun. 9, 1987

[54] COMPASS MECHANISM USED IN COMBINATION WITH HANDLE OR LIKE ELEMENT ON THE INTERIOR OF AN AUTOMOBILE TYPE VEHICLE

[76] Inventor: Donald Baxter, 14301 NE. 19 Ave., Miami, Fla. 33181

[21] Appl. No.: 809,599

[22] Filed: Dec. 16, 1985

[51] Int. Cl.⁴ .............................................. B23B 49/00
[52] U.S. Cl. ........................................ 33/333; 33/354; 33/355 R
[58] Field of Search ................. 33/333, 334, 335, 347, 33/354, 355 R, 370, 371

[56] References Cited

U.S. PATENT DOCUMENTS

| | | | |
|---|---|---|---|
| 1,307,935 | 6/1919 | Starling et al. | 33/333 |
| 1,317,086 | 9/1919 | McConnell | 33/333 |
| 3,276,137 | 10/1966 | Lore | 33/354 |
| 4,309,828 | 1/1982 | Sakamoto | 33/333 |
| 4,404,752 | 9/1983 | Hanna | 33/355 R |

*Primary Examiner*—Willis Little
*Attorney, Agent, or Firm*—John Cyril Malloy

[57] ABSTRACT

A compass assembly including a compass mechanism mounted in supported relation on a base and covered by a transparent material shield wherein the assembly is specifically structured to be mounted on a handle element itself being a part of a support structure on the interior of an automobile type vehicle. The compass assembly is also structured so as to be movable with the handle element or like element on which it is mounted and at the same time viewable by an occupant of the vehicle to inform such occupant of the direction of travel of the vehicle.

6 Claims, 6 Drawing Figures

COMPASS MECHANISM USED IN COMBINATION WITH HANDLE OR LIKE ELEMENT ON THE INTERIOR OF AN AUTOMOBILE TYPE VEHICLE

BACKGROUND OF THE INVENTION

1. Field of the Invention

This invention relates to a compass assembly adapted to be mounted on or considered a part of a handle element wherein the handle element may be secured to or be part of a number of supporting structures on the interior of a vehicle such as a gear shift lever, transmission indicator, or handle for a cigarette lighter or other instrument, etc.

2. Description of the Prior Art

Compass structures of course have been known for many years and have been used as a primary instrument in navigation and direction finding. Even with today's modern-day technology, compasses are used in automobile type vehicles as an indication to both driver and occupants of the vehicle as to the general direction of travel pursued by the vehicle. However, typically, such compass assemblies are primarily provided in an automobile type vehicle as an after-thought. Mountings for such compass type structures are frequently accomplished by securing, through adhesive or like connectings for the compass assembly to the inside surface of the front window or windshield glass of the vehicle. While mounting of the compass in such a manner is operative to the extent of providing a clear view of the compass to the operator or occupant of the vehicle, such a mounting and accompanying compass assembly frequently interfers with the view of the road and is generally unsightly.

While the prior art is replete with compass mechanisms incorporating numerous mounting orientations and structures, there is no specific disclosure or teaching of a compass mechanism or assembly "built in" to the conventional structural component of an automobile type vehicle interior. For example, U.S. Pat. Nos. 1,208,824; 1,822,340; 2,594,148; and 3,276,137 are representative of compass mechanism mountings and structures adapted for a specific mounting orientation. However, none specifically show the integration of the compass mechanism into a conventional structural component, such as a handle, gear shift lever, transmission indicator, or the like normally associated with the structure and operation of an automobile type vehicle.

It is readily apparent therefore that mounting of a compass mechanism in the manner indicated to provide a "built in" appearance as being a part of a conventional structural component is desirable from the standpoint of aesthetics as well as functionality to the extent that the compass mechanism is viewable from an operator or occupant of the vehicle but in essence blends into the interior by being considered a part of one of the structural components as set forth above.

SUMMARY OF THE INVENTION

The present invention is directed towards a compass assembly specifically designed to be used in combination with a handle element of the type found on the interior of an automobile vehicle. The handle element used in combination with the subject compass assembly may take a variety of structural configurations and attendant uses such as the gear shift lever on an automobile of the type movably mounted adjacent the steering wheel. Alternately, the handle element may be a transmission indicator lever or gear shift lever which is floor mounted. Yet another embodiment of the present invention is the handle element used for a variety of other structural and functional purposes such as opening the glove compartment, an on/off headlight switch lever, and a variety of other similar type structures.

The compass assembly of the present invention comprises a base disposed in supporting and in some cases enclosing relation to the compass mechanism itself. The compass mechanism may itself comprise a substantially conventional design wherein the compass may be in the form of a bulb type configuration having a curvilinear or spherical outer surface configuration mounted in a movable or "floating" manner on the interior of a transparent shield. The shield is provided to allow clear viewing of the face of the compass mechanism such that directional indication is clearly available.

Dependent upon the mounting of the subject compass assembly and the particular handle element on which it is positioned, the structure of the combined base, shield and compass mechanism may vary in order to facilitate viewing of the above set forth face of the compass mechanism to communicate, through visual indication, the direction of travel of the vehicle.

Other structural features of the subject compass assembly include, in certain embodiments, the ability to remove the base and attached shield and compass mechanism from the handle element on which it is mounted and thereby use the compass assembly in a detached form from the vehicle such as in emergency situations when the vehicle and occupants are lost, as in cross country travel, etc.

The invention accordingly comprises the features of construction, combination of elements and arrangement of parts which will be exemplified in the construction hereinafter set forth, and the scope of the invention will be indicated in the claims.

DESCRIPTION OF THE DRAWINGS

For a fuller understanding of the nature of the invention, reference shoud be had to the following detailed description taken in connection with the accompanying drawings in which.

Like reference numerals refer to like parts throughout the several views of the drawings.

DETAILED DESCRIPTION OF THE PREFERRED EMBODIMENT

Figures 1, 2:
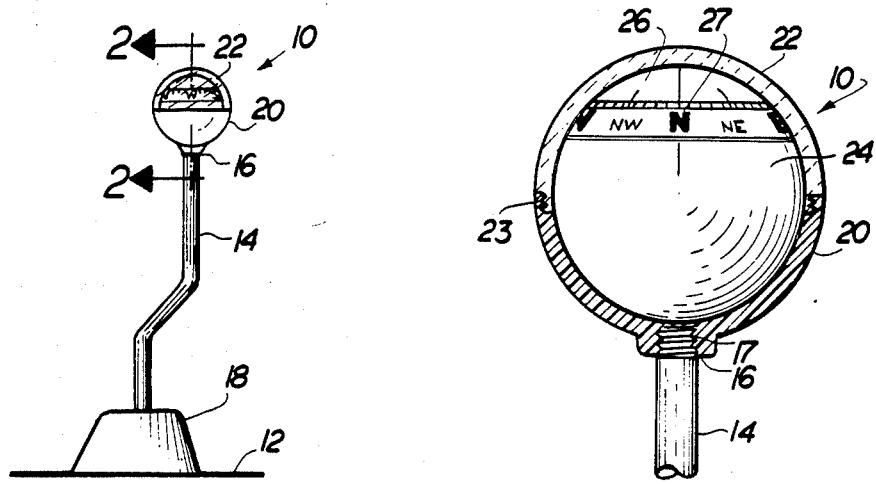
FIG. 1 is a front plan view of one embodiment of the compass assembly of the present invention mounted on a gear shift lever associated with an automobile interior.
FIG. 2 is a sectional view along line 2—2 of FIG. 1.
Figure 3:
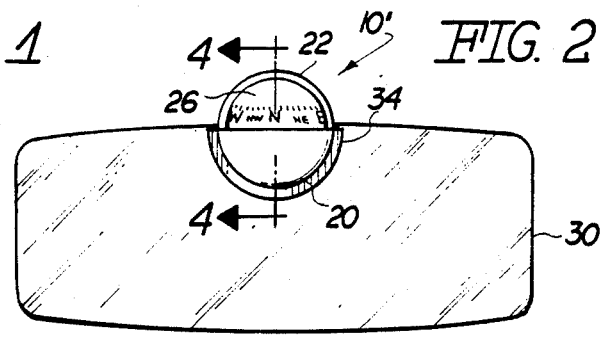
FIG. 3 is front plan view of another embodiment of the compass assembly of the present invention mounted on a rear view mirror assembly of the type associated with the interior of an automobile type vehicle.
Figures 4, 5, 6:
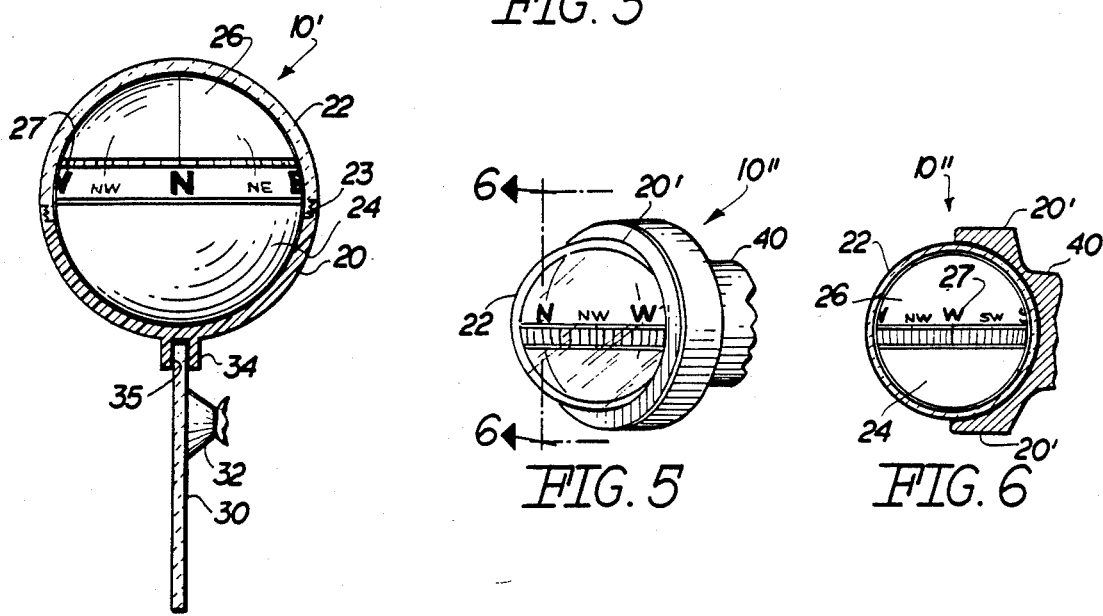
FIG. 4 is a sectional view along line 4—4 of FIG. 3.
FIG. 5 is an isometric view in partial cutaway of yet another embodiment of the compass assembly of the present invention mounted on a handle element for an instrument such as a cigarette lighter associated with the interior of an automobile type vehicle.
FIG. 6 is a sectional view along line 6—6 of FIG. 5.

As shown in FIGS. 1 through 6, the present invention is directed towards a compass assembly generally indicated as 10 in the embodiment of FIGS. 1 and 2; and 10' in the embodiments of FIGS. 3 and 4; and 10" in the embodiments of FIGS. 5 and 6.

Referring first to FIGS. 1 and 2, the compass assembly 10 is designed to be mounted on the interior of an automobile represented as 12 in any one of a number of locations such as on a gear shift lever 14 having an elongated configuration and protruding outwardly at one end from a base 18 which the interior thereof leads to the transmission box. The opposite end 16 includes a threaded mounted structure 17 designed to be removably secured to a base 20 of the compass assembly. A shield 22 is formed of a transparent material to provide viewing therethrough. Further, the shield 22 is threadedly and therefore removably secured as at 23 to the base 20.

The compass assembly 10 further includes a compass mechanism 24 having a face 26 specifically oriented relative to the shield 22 so as to be viewable therethrough by an occupant or operator of the vehicle. Viewing of the face 26 is of course possible due to the fact that the shield 22 is made from a transparent material as set forth above. The face 26 of the compass mechanism 24 has directional indicia 27 formed thereon so as to clearly indicate to and observe the direction o intended direction of vehicle travel.

For purposes of clarity, the details of the compass mechanism 24 have been omitted. Suffice it to say that the compass mechanism 24 freely moves in a "floating" fashion on the interior of the base and as well the interior of the shield 22. In order to accomplish such free rotational or floating movement of the compass mechanism 24, both the base 20 and shield 22 have a hollow interior configuration and are hemispherical in shape. However, their joining at a common junction due to the threaded connection 23 collectively defines a spherical or bulb-like configuration which, in the embodiments of FIGS. 1, 2, 5 and 6 allows the compass assembly 10 and 10" to be grasped as a handle knob for pulling and/or movement of the respective supporting structure to which the compass assembly 10, 10' is attached. With regard to the embodiments of FIGS. 3 and 4, the supporting structure is therein disclosed as a rear view mirror 30 wherein the base 20 (see FIG. 4) has a bottom-most channel integrally formed thereon wherein the channel 35 is designed to frictionally engage and envelope the upper peripheral edge (see FIG. 3) of the mirror 30 so as to maintain the compass assembly 10' thereon. In such orientation, the face 26 of the compass mechanism 24 is clearly viewable along with the directional indicia 27 in that, as set forth above, the shield 22 is made of a transparent material. A support stem 32 is secured to the mirror 30 in a conventional fashion.

With regard to FIGS. 5 and 6, the supporting structure on which the compass assembly 10" is mounted may represent a handle element 40 for an instrument of the vehicle mounted on the dashboard such as an on/off headlight switch, cigarette lighter, interior light switch, glove compartment handle, etc. In such embodiment, the base 20' has a circular or annular outwardly projecting rim which facilitates grasping of the assembly 10' by the fingers of an operator or occupant of a vehicle. The shield 22 again is formed of a transparent material so as to allow clear viewing of a face 26 and the directional indicia 27 thereon.

It is therefore to be understood that the following claims ar intended to cover all of the generic and specific features of the subject invention herein described, and all statements of the scope of the invention which as a matter of language, might be said to fall therebetween.

Now that the invention has been described,

What is claimed is:

1. In combination, a compass assembly and supporting structure mounted on the interior of a vehicle, said combination comprising:
    (a) said compass assembly including a compass mechanism secured to a base in supported relation on an interor thereof and a shield structure made from a transparent material and disposed in surrounding, covering relation to a predetermined surface of said compass mechanism,
    (b) said shield structure correspondingly configured to said compass mechanism and disposed in overlying, protecting relation thereto,
    (c) said base having an internal configuration substantially corresponding to said shield structure and fixedly secured to an exterior portion thereof in surrounding relation to said exterior portion,
    (d) said base further including a continuous annularly configured rim integrally formed thereon and extending outwardly from a remaining outer surface thereof and defining a finger gripping portion,
    (e) said supporting structure comprising a handle element of an instrument on the dashboard of the vehicle, said handle element protruding outwardly from the dashboard and said compass assembly mounted on and defining the extremity of said handle element and further dimensioned and configured to define a handle knob by which said handle element is pulled outwardly from said dashboard,
    (f) said compass mechanism including a compass face formed thereon and defining said predetermined surface being movably positioned in underlying relation to said shield structure in exposed viewably position therethrough.

2. An assembly as in claim 1 wherein said compass face comprises a substantially bulb-like configuration having a substantially spherical exterior surface configuration including indicia thereon representative of directional compass markings.

3. A combination as in claim 1 wherein said shield structure comprises a closed substantially spherical configuration surrounding and enclosing said compass mechanism and said based being fixed to a portion of an outer surface of said shield structure in surrounding relation thereto.

4. In combination, a compass assembly and supporting structure mounted on the interior of a vehicle, said combination comprising:
    (a) a compass mechanism secured to a base in supported relaion on the interior thereof, and a shield shtructure made from a transparent material and disposed in surrounding, covering relation to a predetermined surface of said compass mechanism,
    (b) said shield structure and said base secured to one another and collectively positioned in surrounding, enclosing relation to said compass meachanism,
    (c) said shield structure and said base each comprising a hollow interior respectively defined by a curved inner surface, said compass mechanism movably mounted within said shield structure and base,
    (d) said compass meachanism including a compass face formed thereon and defining said predetermined surface being movably positioned in underlying relation to said shield structure in exposed viewable position therethrough, (e) said support structure comprising a gear shift lever mounted on the floor of an automobile type vehicle, said base removably attached to an outer extremity of said gear shift lever and said base and said shield secured together to define a hande knob dimensioned and configured for grasping and selective movement of the gear shift lever, (f) said base including a mounting structure protruding outwardly from an undersurface portion thereof and disposed and structured to removably receive a distal end of said gear shift lever therein.

5. An assembly as in claim 3 wherein said base is removably mounted on said supporting structure and fixedly secured to said shield, said compass mechanism movable within said shield and relative to said base; said base, compass mechanism and shield removable from said handle/element as a unit and operable away from the vehicle.

6. In combination, a compass assembly and supporting structure mounted on the interior of a vehicle, said combination comprising:

(a) a compass mechanism secured to a base in supported relation on an interior thereof, and a shield structure made from a transparent material and disposed in surrounding covering relation to a predetermined surface of said compass meachanism, (b) said shield structure and said base secured to one another and collectively positioned in surrounding, enclosing relation to said compass mechanism, (c) said shield structure and said base each comprising a hollow interior respectively defined by a curvilinear inner surface, said compass mechanism removably mounted within said shield structure and base, (d) said compass meachanism including a compass face formed thereon and defining said predetermined surface being movably positioned in underlying relation to said shield structrue in exposed, viewable position therethrough, (e) said supporting structure comprising a rear view mirror mounted adjacent a windshield of the vehicle, said base secured to an upper peripheral edge of said rear view mirror and said shield structure extending upwardly and outwardly from said mirror, said compass face protruding above said rearview mirror and viewable by an operator of the vehicle, (f) said base including a mounting structure protruding outwardly from an undersurface thereof and disposed and structured to removably receive said peripheral edge of said mirror therein, and (g) said shield structure and said base collectively comprising an internal configuration corresponding to said compass mechanism and a substantially spherical outer surface configuration of the size to be gripped by the hand of the operator and removed from said mirror.

* * * * *